United States Patent [19]

Jankowiak

[11] 4,068,382

[45] Jan. 17, 1978

[54] ANGLE TANGENT MICROMETER

[76] Inventor: Joseph E. Jankowiak, 2910 Culver Road, Rochester, N.Y. 14622

[21] Appl. No.: 773,928

[22] Filed: Mar. 3, 1977

[51] Int. Cl.² ............................ B43L 7/00; B43L 13/00
[52] U.S. Cl. ........................................... 33/75 R; 33/97
[58] Field of Search .............. 33/97, 98, 75 R, 174 S, 33/1 N, 94; 235/61 GM

[56] References Cited

U.S. PATENT DOCUMENTS

| 1,678,019 | 7/1928 | Oates | 33/97 |
| 2,136,958 | 11/1938 | Tyson | 33/75 R |
| 3,085,345 | 4/1963 | Pearson | 33/174 S |
| 3,322,340 | 5/1967 | Frantland | 33/75 R X |

Primary Examiner—Harry N. Haroian

[57] ABSTRACT

The instrument comprises a protractor secured on a plate beneath a reciprocable micrometer shaft which projects from a cylindrical housing that is secured on the plate adjacent the protractor. An extension of the shaft overlies part of the protractor and is pivotally connected by an indicator pin to the bifurcated end of a rod, which slides intermediate its ends in a turntable that pivots on the plate coaxially of the locus of the radial lines formed on the face of the protractor to represent various angular positions. When the operating thimble of the micrometer is rotated to shift the micrometer shaft, a point on the lower end of the indicator pin registers with different angular designation on the protractor. At any instant, the decimal graduation on the micrometer housing with which the forward end of the thimble registers will correspond to the tangential value of the angle then registering with the pointed end of the pin.

2 Claims, 4 Drawing Figures

ANGLE TANGENT MICROMETER

This invention relates to a device for converting angular measurements from degrees to the tangential equivalents, and vise versa, and more particularly to an instrument of this type which is capable of making such conversions rapidly and accurately.

When working with angular measurements, it is often necessary to convert the value of an angle from degrees and minutes into, for example, its tangential value, which is given in decimal form. To effect this conversion it is common practice to utilize a conversion table, which lists numerically the tangential equivalents for various angles and fractions thereof. One of the disadvantages of converting in this fashion is that it is very time-consuming for an operator to have to look up tangent valves on a chart in order to convert between angles and tangents. Also, this type of conversion requires that a chart be kept available for reference, and such charts are easy to misplace and/or damage. Moreover, because of the numerous values that are usually set forth in the chart, extreme care must be taken to prevent human error when converting an angle to its tangent value, or vise versa.

It is an object of this invention, therefore, to provide a novel instrument which is particularly suitable for use in rapidly and accurately converting the value of an angle in degrees to its tangential equivalent, or vise versa.

Still another object of this ivention is to provide a mechanical instrument which will eliminate the need for employing charts for converting angular values to corresponding tangential values, and vise versa.

Another object of this invention is to provide a novel device which combines the features of a micrometer and a protractor for making extremely accurate conversions between angular and tangential measurements.

Other objects of this invention will be apparent hereinafter from the specification and from the recital of the appended claims, particularly when read in conjunction with the accompanying drawing.

Figure 1:
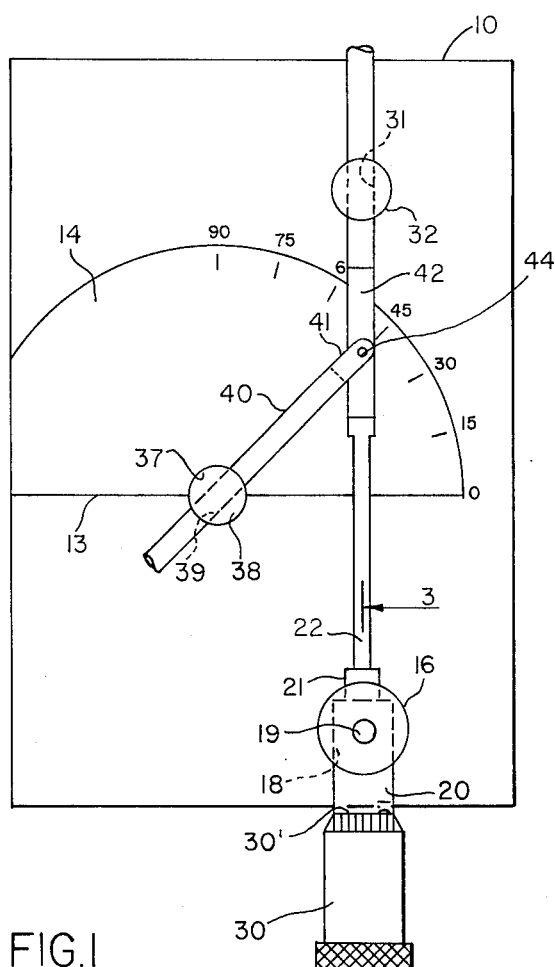
FIG. 1 is a fragmentary plan view of an angle tangent micrometer made according to one embodiment of this invention, and illustrating the micrometer and indicator portions of the instrument in their 45° positions.

Referring now to the drawing by numerals of reference, 10 denotes a rigid plate or base on the face of which is secured a conventional protractor 14. The lower straight edge 13 of the protractor extends parallel to the lower edge of base 10. Protractor 14 has on its face the usual lines and indicia indicating various angular positions and the values thereof in degrees and/or minutes, depending upon the size of the protractor. Only a few of these angular positions, however, have been illustrated in FIG. 1 — e.g. 0°, 15°, 30°, etc.

Secured at its lower end to the face of the base 10 adjacent its lower, right hand corner (FIG. 1) is a cylindrical support or post 16, which is fastened in place by a screw 17 (FIG. 2) that extends through the base 10 and into the bottom of post 16. Intermediate its ends post 16 has therethrough a diametral bore 18 the axis of which extends at right angles to the straight edge 13 of the protractor 14, and parallel to the plane, upper surface of the protractor.

Secured at its forward end coaxially in the bore 18 of the post 16 by a set screw 19 is the forward end of a tubular micrometer housing 20. Reciprocable in the bore of housing 20 is an axially bored micrometer screw 21, which has projecting from the forward end of its bore a reduced-diameter extension 22. The extension 22 has a head 23 held against a circumferential shoulder 24 in the screw 21 by a pin 25. Pin 25 is held against movement in screw 21 by a set screw 26 which threads into the rear end of screw 21 and against the rear end of pin 25.

Screw 21 has an externally-threaded portion 27 engaged with threads 28 formed in the bore in the stationary housing 20. Screw 21 is secured to a thimble sleeve 29 and conventional thimble 30, which are rotatably mounted on housing 20 for axial adjustment therealong in the usual manner.

The micrometer shaft extension 22 overlies one end of the protractor 14. Its outer end, which is slightly larger in diameter, extends slidably through a registering bore 31, which is formed diametrically through the upper end of a cylindrical post 32, which is secured by a screw 33 to the face of base 10 adjacent the upper right hand corner thereof. The bore 31 in post 32 registers coaxially with the bore 18 in post 16, so that the micrometer shaft extension 22 is supported above and parallel to the face of the protractor 14.

Figure 2:
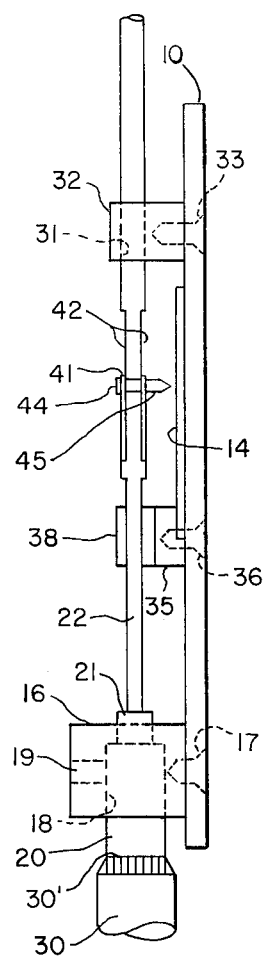
FIG. 2 is a fragmentary side elevational view of this instrument.
Figure 3:
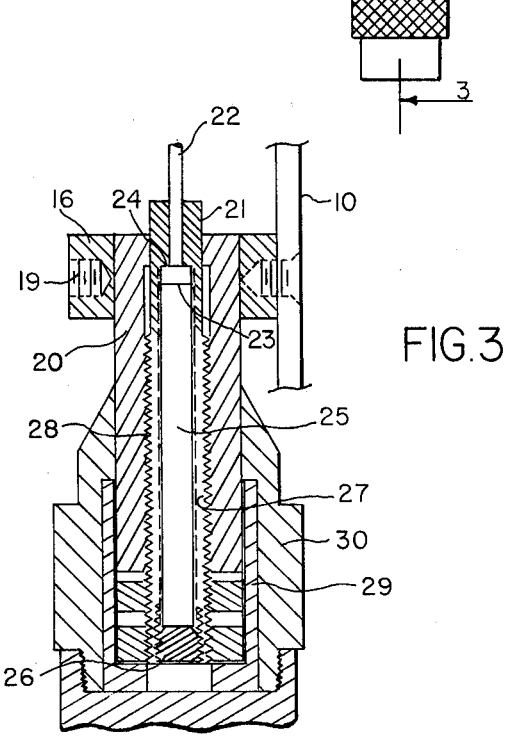
FIG. 3 is a fragmentary cross sectional view taken along the line 3—3 in FIG. 1 looking in the direction of the arrows.

A further post 35 (FIG. 2) is secured at its lower end by a screw 36 to the face of the plate 10 so that its axis registers with the center point of the angular measurements inscribed on the protractor 14. For this reason an arcuate notch 37 is formed in the lower edge 13 of the protractor centrally thereof to accomodate a portion of the post 35. Rotatably mounted on the upper end of the post 35 coaxially thereof is a cylindrical turntable or pivot 38. Slidably guided intermediate its ends in a diametral bore 39 in the turntable 38 is a cylindrical rod 40. Rod 40 has a bifurcated end 41 the legs of which flank diametrically opposite sides of the micrometer shaft extension 22 along portions of the shaft which are flated off as at 42. The bifurcated end of rod 40 is pivotally connected to the extension 22 by a pin 44, which extends through registering openings in the furcations on rod 40 and the registering portion of extension 22. On its lower end, as shown in FIG. 2, the pin 44 has a pointed end 45, which is positioned immediately above the face of protractor 14.

When the shaft extension 22 is reciprocated, the rod 40 simultaneously slides axially in the bore 39 of the turntable 38, and the turntable rotates or oscillates coaxially on the post 35. Likewise at this time the furcated ends of the rod 40 pivot about the axis of pin 44 to allow extension 22 to reciprocate coaxially of the bores 31 and 18 in the posts 32 and 16, respectively. During this movement the pin 44 is shifted across the face of the protractor 14 in a line (vertical line in FIG. 1) which lies in a vertical plane through the axis of the shaft 21 and its extension 22 thereby shifting its lower, pointed end into registry with different ones of the numerous lines which are inscribed or otherwise formed on the face of protractor 14 to represent various angular positions of the rod 40 about the axis of turntable 38.

Figure 4:
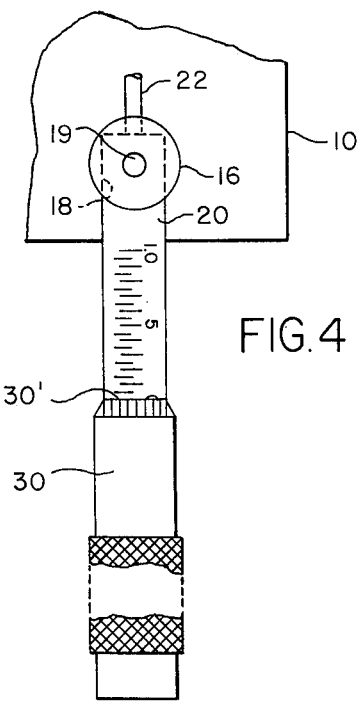
FIG. 4 is a fragmentary plan view of part of the instrument as shown in FIG. 1, but illustrating its adjustable micrometer barrel in the retracted position it assumes when the indicator portion of the instrument is in its zero degree position.

Moreover, during this reciprocable movement of the shaft 22 the forward end 30' of the operataing thimble 30 shifts axially on the housing 20 to register with different graduations which are marked on the outer periphery of housing 20 as illustrated, for example, in FIG. 4. As shown in this Figure, the graduations terminate at the upper end of the housing 20 with the designation "1.0", and at the lower end of the housing with the designation "0", only a portion of wich zero can be seen in FIG. 4. Thus, when the thimble 30 has been threaded fully onto housing 20, as shown for example in FIG. 1, the forward end 30' of the barrel will register with the designation "1.0" on housing 20, at the same time that the lower, pointed end of the pin 45 will register with the line on the protractor 14 which is designated at 45°. Moreover, when the thimble 30 has been threaded off of the housing 20 to its outer limit position as illustrated in FIG. 4, the upper end 30' of the thimble will then register with the indicum on the housing 20 which reads "0", while at the same time the lower, pointed end of the pin 44 will be positioned directly over the lower, "0" degree edge 13 of the protractor. For any position in between these two limit positions of the thimble 30, its forward end 30' will register with a decimal indicia on the housing 20 which corresponds exactly to the tangent value of the particular angle, in degrees, which is at that time indicated by the position of the lower, pointed end of the pin 45 relative to the angular graduation inscribed on the face of the protractor.

From the foregoing, it will be apparent that the instant invention provides a relatively simple, accurate, and inexpensive means for quickly converting the value of an angle to its corresponding tangential value, and vise versa. It should be noted that the indicia on the housing 20 is in the reverse order of the values which are normally found on a conventional micrometer, the thimble of which would normally read zero when fully threaded onto the micrometer housing, and which would read "1.0", or a maximum, when threaded off of the housing to its outerlimit position, as shown for example in FIG. 4. Moreover, it will be readily apparent that although the device has been described in connection with the measurement of angles between 0° and 45°, it is, of course possible, through the proper use of cotangent values, and the like, to determine the tangential values of angles greater than 45°.

Furthermore, it will be apparent to one skilled in the art that this device can be incorporated in various angle measuring or indicating instruments normally used in various fields, such as aviation, surveying, etc., wherever it would be desirable to provide a ready and quick conversion between angular measurements and their tangential equivalent.

Although the invention has been described and illustrated in detail in connection with only a single embodiment thereof, it will be apparent also that this application is intended to cover any such modifications as may fall within the scope of one skilled in the art or the appended claims.

Having thus described my invention, what I claim is:

1. A device
for converting between angular values and the corresponding tangential values, comprising
a protractor,
means mounting a cylindrical micrometer housing adjacent said protractor, said housing having on a portion of its outer peripheral surface a set of axially spaced graduations,
a reciprocable shaft projecting slidably from one end of said housing and extending over, and parallel to, a portion of at least one quadrant of said protractor,
said housing having a sleeve rotatably mounted thereon and operatively connected to said shaft to shift said shaft selectively in and out of said one end of said housing,
a pin carried by said shaft and having a pointed end overlying said protractor for movement by said shaft between a first limit position in which the pointed end of said pin registers with a line on said protractor corresponding to a zero angle on the protractor, and a second limit position in which said pointed end registers with a line denoting an angle of 45° on the protractor,
said graduations on said housing being calibrated to represent the corresponding tangential values of the angles included on the protractor between said zero and 45° designations,
said sleeve being mounted to reciprocate axially on said housing, when rotated in opposite directions thereon,
said sleeve being in one of its limit positions when the pointed end of said pin registers with the zero angle on said protractor, and is in the other of its limit positions when said pointed end registers with the 45° angle on said protractor,
one end of said sleeve registering with a graduation denoted as zero on said housing, when the sleeve is in said one, position, and registering with a graduation denoted as "1" on said housing, when said sleeve is in its other limit position,
a rod having a bifurcated end pivotally connected to said shaft by said pin, and
means supporting said rod intermediate its ends for pivotal movement about the center point of said protractor, and for sliding movement at right angles to axis of its pivotal movement, whereby when said shaft is reciprocated the angular position of said rod about said center point will have its corresponding tangential value represented by the graduation on said housing then in registry with said one end of said sleeve.

2. A device
for converting angular measurements to their corresponding tangential values, and vice versa, comprising
a base having thereon a plane surface,
means defining at least a portion of a protractor on said surface, and including a plurality of lines, one of which corresponds to zero degrees about a point on said surface, and another of which is angularly spaced 45° about said point from said one line,
a micrometer housing mounted on said base and having a reciprocable shaft projecting from one end thereof over said plane surface at right angles to said one line and for reciprocation parallel to said plane surface,
a rotatable sleeve on said housing mounted to shift axially thereon between first and second limit positions and operatively connected to said shaft to impart reciprocation thereto,
a plurality of axially-spaced graduations on said housing registrable selectively with one end of said sleeve during axial movement thereof on said housing, a pin projecting radially from said shaft and having a pointed end overlying said plane surface on said base selectively to register with different ones of said lines during reciprocation of said shaft, said graduations being calibrated so that the graduation which registers at any instant with said one end of said sleeve will correspond to the tangent value of the angle represented by the line on said surface that is located at that instant beneath the pointed end of said pin, a member mounted to rotate on said base above said plane surface and coaxially about a line extending through said point at right angles to said plane surface, and a rod slidably mounted to intermediate its ends in a bore which extends through said member at right angles to its pivotal axis, said rod being pivotally connected at one end by said pin to said shaft, whereby the angular position of said rod will correspond to the angular value denoted on said protractor portion by the pointed end of said pin.

* * * * *